US010103999B2

(12) United States Patent
Huo et al.

(10) Patent No.: US 10,103,999 B2
(45) Date of Patent: Oct. 16, 2018

(54) JITTER BUFFER LEVEL ESTIMATION

(71) Applicant: DOLBY LABORATORIES LICENSING CORPORATION, San Francisco, CA (US)

(72) Inventors: JiaQuan Huo, McMahons Point (AU); Xuejing Sun, Beijing (CN); Kai Li, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 27 days.

(21) Appl. No.: 15/125,564

(22) PCT Filed: Apr. 8, 2015

(86) PCT No.: PCT/US2015/024959
§ 371 (c)(1),
(2) Date: Sep. 12, 2016

(87) PCT Pub. No.: WO2015/160596
PCT Pub. Date: Oct. 22, 2015

(65) Prior Publication Data
US 2017/0026298 A1    Jan. 26, 2017

Related U.S. Application Data

(60) Provisional application No. 61/989,331, filed on May 6, 2014.

(30) Foreign Application Priority Data

Apr. 15, 2014    (CN) .......................... 2014 1 0151665

(51) Int. Cl.
*H04L 12/841*    (2013.01)
*H04J 3/06*    (2006.01)
(Continued)

(52) U.S. Cl.
CPC .......... *H04L 47/283* (2013.01); *H04J 3/0632* (2013.01); *H04L 43/087* (2013.01); *H04L 47/30* (2013.01)

(58) Field of Classification Search
CPC ..... H04L 47/283; H04L 43/087; H04L 47/30; H04J 3/0632
See application file for complete search history.

(56) References Cited

U.S. PATENT DOCUMENTS 6,452,950 B1 * 9/2002 Ohlsson ................ H04J 3/0632
370/516
6,735,192 B1 5/2004 Fried
(Continued)

FOREIGN PATENT DOCUMENTS

AU    2003271320    9/2004
EP    1564935    8/2005
(Continued)

OTHER PUBLICATIONS

Atzori, L. et al "Playout Buffering in IP Telephony: A Survey Discussing Problems and Approaches" IEEE Communications Surveys & Tutorials, vol. 8, No. 3, pp. 36-46, 2006.
(Continued)

*Primary Examiner* — Edan Orgad
*Assistant Examiner* — Saumit Shah (57) ABSTRACT

Some implementations involve controlling a jitter buffer size during a teleconference according to a jitter buffer size estimation algorithm based, at least in part, on a cumulative distribution function (CDF). The CDF may be based, at least in part, on a network jitter parameter. The CDF may be initialized according to a parametric model. At least one parameter of the parametric model may be based, at least in part, on legacy network jitter information.

21 Claims, 6 Drawing Sheets

(51) Int. Cl.
*H04L 12/26* (2006.01)
*H04L 12/835* (2013.01)

(56) References Cited

U.S. PATENT DOCUMENTS

| | | | |
|---|---|---|---|
| 7,006,614 B2 | 2/2006 | Feinberg | |
| 7,103,003 B2 * | 9/2006 | Brueckheimer | H04L 41/145 370/252 |
| 7,359,324 B1 * | 4/2008 | Ouellette | H04L 43/087 370/230 |
| 7,551,647 B2 | 6/2009 | Fellman | |
| 7,573,894 B2 | 8/2009 | Schulz | |
| 7,835,280 B2 | 11/2010 | Pang | |
| 7,881,284 B2 | 2/2011 | Lin | |
| 8,131,998 B2 | 3/2012 | Wang | |
| 8,149,884 B2 | 4/2012 | Teramoto | |
| 8,355,338 B2 | 1/2013 | Wu | |
| 8,514,329 B2 * | 8/2013 | Gomez | H04N 21/44209 348/497 |
| 8,843,379 B2 * | 9/2014 | Choi | H04L 49/90 370/229 |
| 9,703,527 B2 * | 7/2017 | Shaharabany | G06F 5/14 |
| 2002/0101885 A1 * | 8/2002 | Pogrebinsky | H04J 3/0632 370/516 |
| 2003/0026275 A1 * | 2/2003 | Lanzafame | H04L 49/90 370/412 |
| 2004/0141528 A1 * | 7/2004 | LeBlanc | H04L 65/80 370/508 |
| 2004/0258047 A1 | 12/2004 | Miao | |
| 2005/0094628 A1 | 5/2005 | Ngamwongwattana | |
| 2005/0207437 A1 * | 9/2005 | Spitzer | H04L 12/66 370/412 |
| 2006/0077994 A1 * | 4/2006 | Spindola | H04J 3/0632 370/412 |
| 2006/0251200 A1 | 11/2006 | Miller | |
| 2007/0211704 A1 | 9/2007 | Lin | |
| 2008/0240004 A1 * | 10/2008 | Shaffer | H04J 3/0632 370/296 |
| 2009/0003369 A1 | 1/2009 | Lundin | |
| 2009/0219395 A1 | 9/2009 | Baker | |
| 2010/0180033 A1 * | 7/2010 | Abdelal | H04L 12/66 709/226 |
| 2010/0290454 A1 * | 11/2010 | Lundberg | H04J 3/0632 370/352 |
| 2010/0296525 A1 | 11/2010 | Mahkonen | |
| 2011/0013618 A1 * | 1/2011 | Wu | H04L 12/66 370/352 |
| 2011/0075577 A1 * | 3/2011 | Chen | H04L 43/087 370/252 |
| 2011/0145872 A1 * | 6/2011 | Choi | H04L 12/66 725/106 |
| 2011/0234200 A1 * | 9/2011 | Shenoi | H04J 3/0632 324/76.38 |
| 2012/0123774 A1 | 5/2012 | Choi | |
| 2013/0028172 A1 * | 1/2013 | Lim | H04W 36/12 370/315 |
| 2013/0286837 A1 | 10/2013 | Khanchi | |
| 2014/0172420 A1 * | 6/2014 | Taleb | H04J 3/0632 704/211 |
| 2016/0143082 A1 * | 5/2016 | Iwakura | H04W 24/02 370/328 |
| 2017/0026298 A1 * | 1/2017 | Huo | H04J 3/0632 |
| 2017/0034026 A1 * | 2/2017 | Li | H04L 65/80 |
| 2017/0104867 A1 * | 4/2017 | Kim | H04M 3/2236 |

FOREIGN PATENT DOCUMENTS

| | | |
|---|---|---|
| EP | 0969632 | 9/2005 |
| EP | 1838066 | 9/2007 |
| EP | 1931068 | 6/2008 |
| EP | 1278353 | 9/2010 |
| GB | 2356537 | 5/2001 |
| WO | 2009/113924 | 9/2009 |
| WO | 2013/044997 | 4/2013 |
| WO | 2014/004259 | 1/2014 |

OTHER PUBLICATIONS

Skoglund, J. et al "Voice Over IP: Speech Transmission over Packet Networks" Springer Handbook of Speech Processing, pp. 307-330, 2008.

Li, M. P. et al "A New Method for Jitter Decomposition Through Its Distribution Tail Fitting" ITC International Test Conference, Feb. 5, 2009, pp. 788-794.

Laurikkala, Mikko "Goodness-of-Fit Tests and Heavy-Tailed Distributions in Network Traffic Data Analysis" Tampereen Teknillinen Yliopisto, Julkaisu-Tampere University of Technology, Aug. 2009, pp. 1-144.

Mahani, A. et al "Heavy-Tail and Voice over Internet Protocol Traffic: Queueing Analysis for Performance Evaluation" published in IET Communications, vol. 5, No. 18, pp. 2736-2743, Dec. 16, 2011.

Repele, L. et al "Improving Performance of Networked Control Systems by Using Adaptive Buffering" IEEE Transactions on Industrial Relations, vol. 61, No. 9, Sep. 2014, pp. 4847-4856.

Morton, et als., Packet Delay Variation Applicability Statement, Mar. 2009 (HTTP://toolsietf.org/rfc/rfc5481.txt—visited Oct. 6, 2016).

* cited by examiner

JITTER BUFFER LEVEL ESTIMATION

CROSS-REFERENCE TO RELATED APPLICATIONS

This application claims priority to Chinese Patent Application No. 201410151665.2, filed Apr. 15, 2014 and U.S. Provisional Patent Application No. 61/989,331, filed May 6, 2014, each of which is hereby incorporated by reference in its entirety.

TECHNICAL FIELD

This disclosure relates to the processing of audio signals. In particular, this disclosure relates to processing audio signals for telecommunications, including but not limited to processing audio signals for teleconferencing or video conferencing.

BACKGROUND

Voice transmission over packet networks is subject to delay variation, commonly known as jitter. Jitter may, for example, be measured in terms of inter-arrival time (IAT) variation or packet delay variation (PDV). IAT variation may be measured according to the receive time difference of adjacent packets. PDV may, for example, be measured by reference to time intervals from a datum or "anchor" packet receive time. In Internet Protocol (IP)-based networks, a fixed delay can be attributed to algorithmic, processing and propagation delays due to material and distance, whereas a variable delay may be caused by the fluctuation of IP network traffic, different transmission paths over the Internet, etc.

VoIP (voice over Internet Protocol) receivers generally rely on a "jitter buffer" to counter the negative impact of jitter. By introducing an additional delay between the time a packet of audio data is received and the time that the packet is reproduced, a jitter buffer can transform an uneven flow of arriving packets into a regular flow of packets, such that delay variations will not cause perceptual sound quality degradation to the end users. Voice communication is highly sensitive to delay. According to International Telecommunication Union (ITU) Recommendation G.114, for example, one-way delay should be kept below 150 ms for normal conversation, with above 400 ms being considered unacceptable. Therefore, the additional delay added by a jitter buffer needs to be small enough to avoid causing perceptual sound quality degradation. Unfortunately, a small jitter buffer will lead to more frequent packet loss when packets arrive later than expected due to network delays.

SUMMARY

According to some implementations described herein, a method may involve receiving legacy network jitter information based on at least one prior teleconference. The legacy network jitter information may include packet delay variation (PDV) information and/or inter-arrival time (IAT) information. The method may involve determining at least one parameter of a parametric model based, at least in part, on the legacy network jitter information.

The method may involve initializing a jitter buffer size estimation algorithm based, at least in part, on the parametric model. The jitter buffer size estimation algorithm may be based, at least in part, on a cumulative distribution function (CDF) of a network jitter parameter. The method may involve controlling a jitter buffer size during a teleconference according to the jitter buffer size estimation algorithm. In some implementations, the method may involve obtaining current network jitter information during the teleconference and updating a database of legacy network jitter information based on the current network jitter information.

In some examples, controlling the jitter buffer size may involve applying asymmetrical smoothing parameters for attack and decay processes. The smoothing parameters may be time-varying.

Some implementations may involve determining a network jitter parameter, such as a packet delay variation (PDV). Applying asymmetrical smoothing parameters for attack and decay processes may involve applying an attack smoothing parameter if the PDV is greater than a current jitter buffer size. The method may involve applying a decay smoothing parameter if the PDV is not greater than a current jitter buffer size.

In some implementations, the jitter buffer size estimation algorithm may be based on the CDF and on a second distribution function. For example, one distribution function may represent a deterministic component of the jitter buffer size estimation algorithm and the other distribution function may represent a non-deterministic component of the jitter buffer size estimation algorithm.

In alternative implementations, the jitter buffer size estimation algorithm may be based on the CDF and on a parametric function. For example, the parametric function may represent a deterministic component of the jitter buffer size estimation algorithm and the CDF may represent a non-deterministic component of the jitter buffer size estimation algorithm.

According to some implementations, the legacy network jitter information may include at least one parameter of the parametric model. In some examples, the legacy network jitter information may include information corresponding to statistical models based on one or more prior teleconferences. In some instances, the legacy network jitter information may include information corresponding to a curve-fitting process performed on PDV and/or IAT data from at least one prior teleconference. Alternatively, or additionally, the legacy network jitter information may include a mean value of at least one of PDV or IAT from at least one prior teleconference. The legacy network jitter information may include at least one of raw PDV data or raw IAT data from at least one prior teleconference.

In some implementations, the legacy network jitter information may be based on one or more environmental factors. The environmental factors may, for example, include one or more of network type, communication device type, destination information or round-trip delay information.

According to some implementations, the CDF may be based, at least in part, on a network jitter parameter. For example, the network jitter parameter may be PVD or IAT. Controlling the jitter buffer size according to the jitter buffer size estimation algorithm may involve determining whether to increment the CDF based, at least in part, on a current network jitter parameter value. Controlling the jitter buffer size according to the jitter buffer size estimation algorithm may involve determining a minimum jitter buffer size according to a function of the CDF and a packet loss threshold.

According to some implementations, these methods and/or other methods may be implemented via one or more non-transitory media having software stored thereon. The software may include instructions for controlling one or more devices to perform such methods, at least in part.

At least some aspects of the present disclosure may be implemented via apparatus. For example, one or more devices may be capable of performing the methods provided herein, at least in part. According to some implementations, an apparatus may include an interface system, a memory system and a logic system. The memory system may be configurable to include a jitter buffer. The interface system may include a network interface, an interface between the logic system and the memory system and/or an external device interface. The logic system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components.

According to some implementations, the logic system may be capable of receiving, via the interface system, legacy network jitter information based on at least one prior teleconference. The legacy network jitter information may, for example, include PDV information and/or IAT information. The logic system may be capable of determining at least one parameter of a parametric model based, at least in part, on the legacy network jitter information.

The logic system may be capable of initializing a jitter buffer size estimation algorithm based, at least in part, on the parametric model. The jitter buffer size estimation algorithm may be based, at least in part, on a cumulative distribution function (CDF) of a network jitter parameter. The logic system may be capable of controlling a jitter buffer size during a teleconference according to the jitter buffer size estimation algorithm.

In some implementations, controlling the jitter buffer size may involve applying asymmetrical smoothing parameters for attack and decay processes. The smoothing parameters may be time-varying. The logic system may be capable of determining a network jitter parameter, such as a packet delay variation (PDV). Applying asymmetrical smoothing parameters for attack and decay processes may involve applying an attack smoothing parameter if the PDV is greater than a current jitter buffer size. Applying asymmetrical smoothing parameters for attack and decay processes may involve applying a decay smoothing parameter if the PDV is not greater than a current jitter buffer size.

According to some implementations, the jitter buffer size estimation algorithm may be based on the CDF and on a second distribution function. For example, one distribution function may represent a deterministic component of the jitter buffer size estimation algorithm and the other distribution function may represent a non-deterministic component of the jitter buffer size estimation algorithm.

However, in some implementations, the jitter buffer size estimation algorithm may be based on the CDF and on a parametric function. For example, the parametric function may represent a deterministic component of the jitter buffer size estimation algorithm and the CDF may represent a non-deterministic component of the jitter buffer size estimation algorithm.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular examples of audio data processing, the teachings herein are widely applicable to other known audio data processing implementations, as well as audio data processing implementations that may be introduced in the future.

The terms "block" and "packet" are used synonymously herein. Accordingly, an "audio block" or a "block of audio data" will have the same meaning as an "audio packet" or a "packet of audio data."

As used herein, the term "buffer" may refer to a region of a physical memory device used to temporarily store data, or to a logical or virtual data buffer that "points" to a location in a physical memory. A "jitter buffer" will generally refer to a logical or a physical buffer for storing received audio frames. Although a jitter buffer will generally be used to temporarily store encoded audio data prior to a decoding process, a jitter buffer may store various forms of audio packets or audio frames, depending on the specific implementation. Therefore, throughout the specification, the term "jitter buffer" shall be construed as including both a jitter buffer actually storing (or pointing to) audio frames and a jitter buffer actually storing (or pointing to) various forms of packets (blocks) which will subsequently be decoded into audio frames before being played out or being fed into components for further processing. The decoding process may not always be explicitly discussed in connection with buffering processes, although decoding will generally be performed prior to reproduction or "playback" of the audio data. Accordingly, the term "frame" as used herein should be broadly construed as including a frame already decoded from a packet, a frame still encoded in a packet, a packet itself including one or more frames, or more than one frame encoded in a packet or already decoded from the packet. In other words, in the context of the present application, processing involving a frame may also be construed as processing involving a packet, or as processing involving simultaneously more than one frame contained in a packet.

In the context of the present application, the meaning of the expression "at the same time" (or the like) includes but is not limited to the exact literal meaning, and shall be construed as "within the same time gap/interval of a predefined granularity". In the present application, for example, the predefined granularity may be the time gap between two consecutively-sent frames/packets (such time gap may be referred to as frame gap), or network probing rate for checking packet arrivals, or processing time granularity, but is not limited thereto. For example, one may quantize the arrival time by frame duration/gap, e.g. 20 ms. Alternatively, or additionally, one may represent time as corresponding to an integer packet number. Similarly, in the context of the present application, when involving a specific time point, depending on the context it may also mean a time gap of the predefined granularity. Further, when involving a specific time t, (i is integer) for a certain frame where it shall be understood as a time point, assuming for clarity that it indicates the time point when the frame starts on the sender side, or indicates the time point when the reception of the frame starts on the receiver side.

As mentioned above, a jitter buffer can counter the negative impact of network instability by temporarily storing received packets of audio data (also referred to herein as "audio packets"), which may correspond to voice data. In some implementations, the jitter buffer may store audio packets before the audio packets are provided to a decoder and subsequently reproduced, e.g., by speakers of a communication terminal.

Figure 1A:
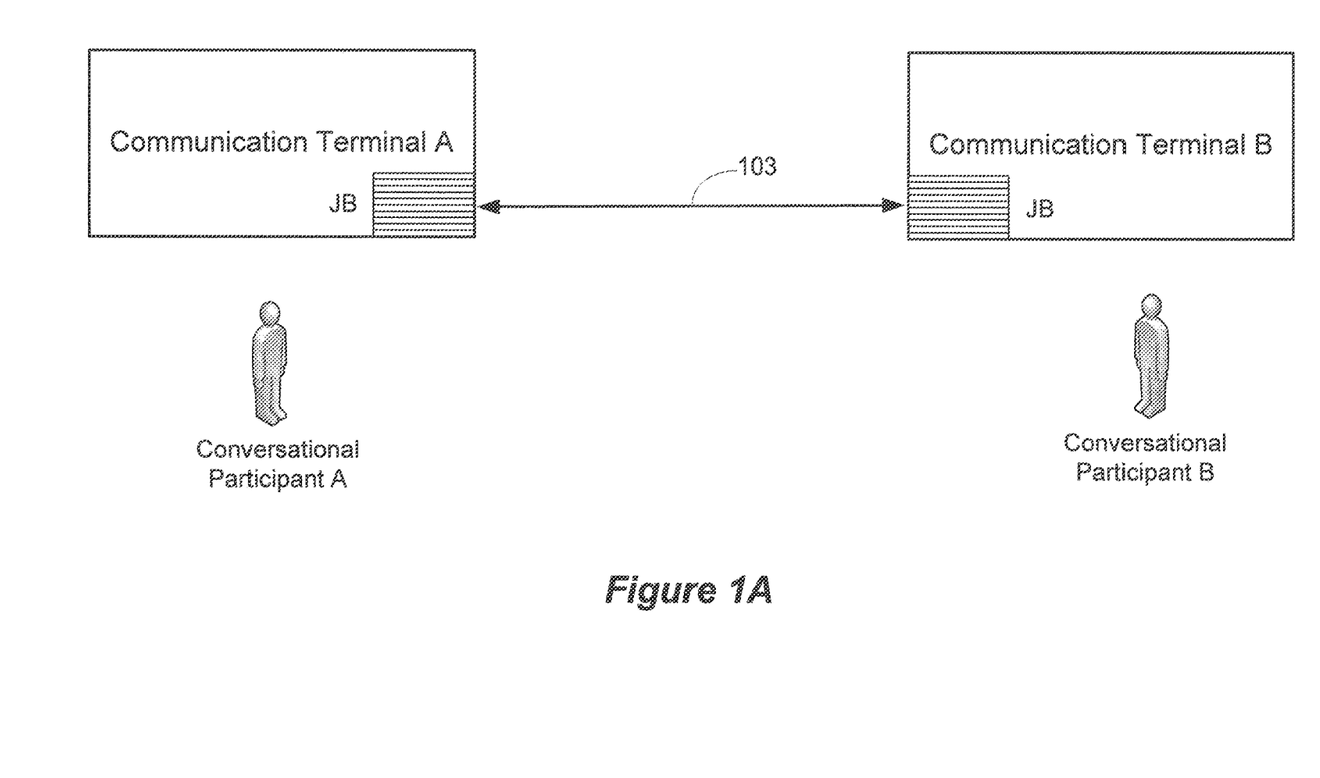
FIG. 1A is a diagram schematically illustrating an example of a voice communication system in which embodiments of the application can be applied.

FIG. 1A is a diagram schematically illustrating an example of a voice communication system in which embodiments of the application can be applied. As illustrated in FIG. 1A, conversational participant A operates a communication terminal A, and conversational participant B operates a communication terminal B. Like other communication terminals shown and described herein, communication terminals A and B may, for example, include telephones, personal computers, mobile electronic devices (e.g., cellular telephones, smart phones, tablets, etc.) or the like. Communication terminals A and B may include components such as those described below (e.g., with reference to FIGS. 5 and 6).

During a voice communication session, such as a teleconference, conversational participant A and conversational participant B may talk to each other via their communication terminals A and B. In this example, the communication terminals A and B are capable of communicating via a data link 103. The data link 103 may be implemented as a point-to-point connection, as a communication network, etc.

In this example, communication terminals A and B are capable of performing VAD (Voice Activity Detection) on audio blocks of audio signals captured by one or more microphones. If a voice presence is detected in an audio block, corresponding processing (e.g., applying a gain suitable for voice data) may be performed on the audio block by a logic system of the communication terminal and the audio block may be transmitted to another conversational participant's communication terminal via the data link 103. If no voice presence is detected in an audio block, corresponding processing (e.g., applying a gain suitable for non-voice data) may be performed on the audio block by a logic system of the communication terminal and the audio block may be transmitted to another conversational participant's communication terminal via the data link 103.

In this example, communication terminals A and B are capable of indicating a silent time to the other conversational participant's communication terminal. As used herein, a "silent time" is a time during which a conversational participant is not speaking. During a "silent time," a conversational participant's communication terminal may detect non-speech sounds, such as ambient noise. Audio data corresponding to such sounds may be processed and may be transmitted to one or more other communication terminals. In some implementations, a silent time may be indicated by transmitting silent time metadata (e.g., by setting a corresponding flag or bit), whereas in other implementations a silent time may be indicated by transmitting nothing during the time period corresponding to an audio block. In some implementations, silent time metadata may correspond with a conversational participant's activation of a "mute" control of a communication terminal.

Figure 1B:
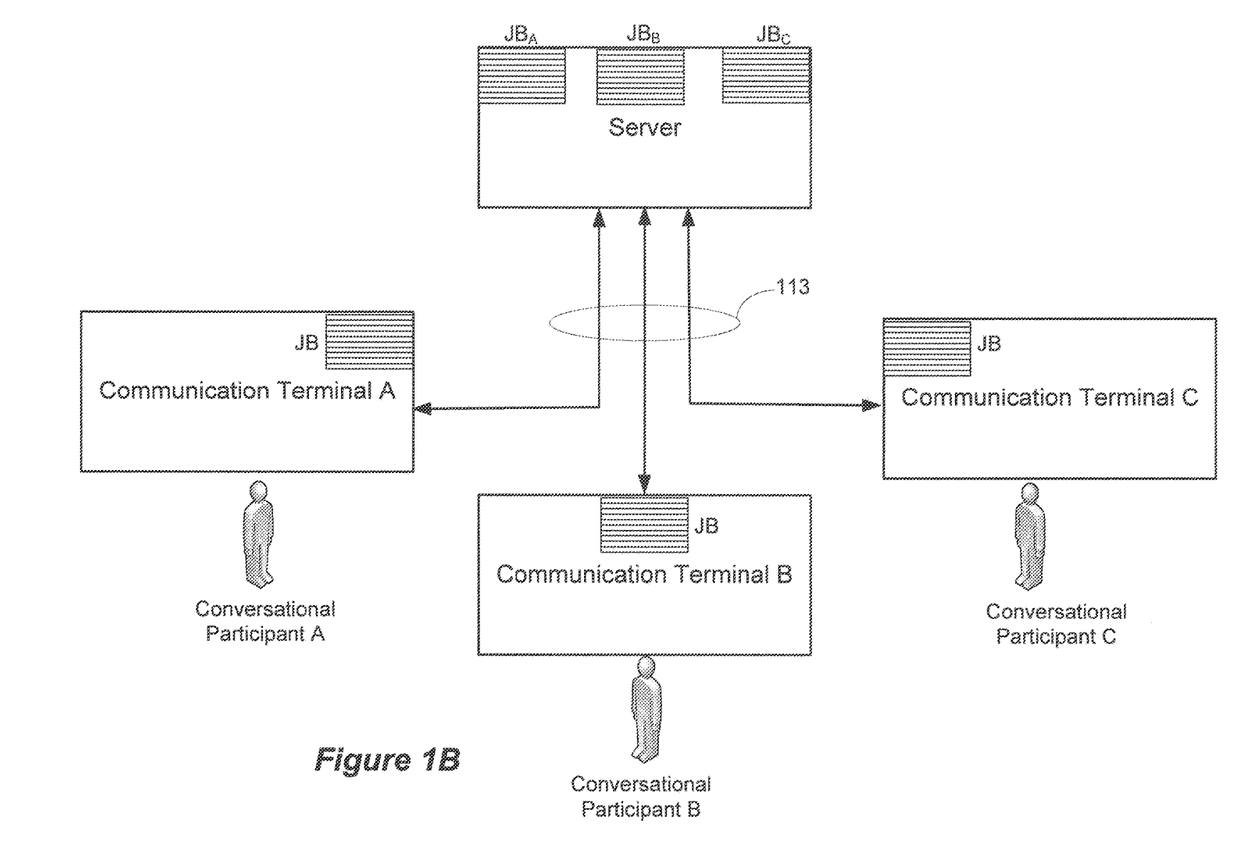
FIG. 1B is a diagram schematically illustrating another example of a voice communication system in which aspects of the application can be implemented.

In this implementation, communication terminals A and B are capable of establishing and controlling jitter buffers, which are represented as "JB" in FIGS. 1A and 1B. Here, communication terminals A and B are capable of receiving encoded audio data, e.g., as audio blocks, and storing them as entries in a jitter buffer. The entries may correspond to a time, e.g., a time at which the audio blocks are received. Audio blocks in the jitter buffer may be decoded and/or otherwise processed for reproduction by one or more speakers of the communication terminal. Reception of silent time metadata or nothing may cause corresponding empty entries in the jitter buffer. Communication terminals A and B may be capable of controlling a jitter buffer size as shown and described herein.

FIG. 1B is a diagram schematically illustrating another example of a voice communication system in which aspects of the application can be implemented. In this example, a voice conference may be conducted among conversational participants A, B and C.

As illustrated in FIG. 1B, conversational participant A operates a communication terminal A, conversational participant B operates a communication terminal B, and conversational participant C operates a communication terminal C. During a voice conference session, conversational participant A, conversational participant B, and conversational participant C may talk to each other through their communication terminals A, B, and C, respectively. The communication terminals illustrated in FIG. 1B may be capable of providing essentially the same functionality as those illustrated in FIG. 1A, from the perspective of conversational participants A, B and C. Although three communication terminals are illustrated in FIG. 1B, other implementations may involve more or fewer communication terminals.

However, in the example shown in FIG. 1B, the communication terminals A, B, and C are configured for communication with another device, which is a server in this example, through a common data link 113 or separate data links 113. The data link 113 may be implemented as a point-to-point connection or a communication network. The communication terminals A, B, and C may be capable of performing VAD and appropriate processing on audio blocks of the audio signal captured by the communication terminal, e.g., as described above.

In this implementation, communication terminals A, B and C are capable of indicating a silent time to the server. In some implementations, a silent time may be indicated by transmitting silent time metadata (e.g., by setting a corresponding flag or bit), whereas in other implementations a silent time may be indicated by transmitting nothing during the time period corresponding to an audio block. The communication terminals A, B and C may be capable of including a "timestamp" or similar time metadata with a transmitted audio packet, indicating the transmission time of the audio packet.

In this implementation, the server is also capable of establishing and controlling jitter buffers. In the example shown in FIG. 1B, the server has established jitter buffers $JB_A$, $JB_B$ and $JB_C$, corresponding to each of the communication terminals A, B and C. For example, the server may be capable of controlling a jitter buffer size as disclosed herein.

In this implementation, the server is capable of receiving the audio blocks transmitted by the communication terminals A, B and C and of storing them to entries in the jitter buffers $JB_A$, $JB_B$ and $JB_C$ corresponding to the times of the audio blocks. For example, the server may be capable of storing the audio blocks to entries in the jitter buffers $JB_A$, $JB_B$ and $JB_C$ corresponding to timestamps of the audio blocks. Reception of the silent time metadata (or nothing) may cause corresponding empty entries in the jitter buffers.

In this example, the server is also capable of mixing audio blocks corresponding to the same time, from each of the jitter buffers $JB_A$, $JB_B$ and $JB_C$, into a mixed audio block. Copies of the mixed audio blocks may be transmitted to each of the communication terminals A, B, and C. The server may include one or more types of timestamps with each of the mixed audio blocks.

Communication terminals A, B, and C are capable of establishing and controlling jitter buffers JB in this example. The communication terminals A, B, and C may receive the mixed audio blocks from the server and may store them to jitter buffer entries corresponding to the times of the mixed audio blocks. For example, the jitter buffer entries may correspond to a time at which the audio blocks are received. In each communication terminal, audio blocks in the jitter buffer may be decoded and reproduced by a speaker system of the communication terminal. Communication terminals A, B, and C may be capable of controlling a jitter buffer size as disclosed herein.

Determining a suitable jitter buffer size can be challenging. A jitter buffer that is too small may cause an unacceptable number of audio packets to be dropped, particularly during times of delay spikes that may be caused, e.g., by increased network activity. However, a jitter buffer that is too long may lead to perceptual delays. In some implementations described herein, a jitter buffer size may be controlled according to a jitter buffer size estimation algorithm based, at least in part, on a cumulative distribution function (CDF) involving at least one network jitter parameter. Such network jitter parameters may, for example, include packet delay variation (PDV) information and/or inter-arrival time (IAT) information.

As noted above, the term "inter-arrival time" is used herein to mean the receive time difference between adjacent packets. As used herein, a "packet delay variation," is measured with reference to a reference or "anchor" packet. For example, assuming that a first packet is received at time R(0) and that the expected time interval between packets (which may be referred to as a "packet gap") is 20 ms, then the "expected" receiving times of the following packets are R(0)+20 msec, +40 msec, +60 msec ..., etc. Jitter may be measured as the difference between the actual time of receiving a packet and the expected time of receiving the packet, e.g., as follows:

$$d_t = \left\lfloor \frac{R_t - R_0 - tL}{L} \right\rfloor \quad \text{(Equation 1)}$$

In Equation 1, the subscript t represents the packet index, $d_t$ represents the PDV associated with the t-th packet, $R_t$ represents the arrival time of the t-th packet and L represents the expected time interval between packets.

A CDF of the PDV may be expressed as follows:

$$c(\tau) := P(d_t < \tau) \quad \text{(Equation 2)}$$

In Equation 2, $P(d_t < \tau)$ represents the probability that $d_t$ is smaller than any given value of the variable $\tau$.

Some implementations disclosed herein involve determining a minimum jitter buffer size according to a function of the CDF and a packet loss threshold, e.g., as follows:

$$B^* = \mathrm{argmin}_\tau \{\tau : c(\tau) \geq 1 - C\} \quad \text{(Equation 3)}$$

In Equation 3, B* represents an optimal jitter buffer size, and C represents a packet loss threshold. For example, C may be set to a maximum packet loss that will be tolerated. In this example, C is a constant satisfying 0<C<1. For example, in some implementations C may be less than 0.1, e.g., 0.03, 0.02, 0.01, 0.005, etc.

However, in practice the CDF will be estimated in real time. In some such implementations, controlling the jitter buffer size according to the jitter buffer size estimation algorithm may involve incrementing the CDF if a current network jitter parameter value exceeds a threshold value, e.g., as follows:

$$\hat{c}_t(\tau) = \begin{cases} \alpha \hat{c}_{t-1}(\tau) + (1-\alpha) & \tau \geq d_t \\ \alpha \hat{c}_{t-1}(\tau) & \text{otherwise} \end{cases} \quad \text{(Equation 4)}$$

In Equation 4, $\hat{c}_t(\tau)$ represents an estimated CDF, $\alpha$ represents a smoothing parameter, which is in the range of zero to one ([0,1]) in this example. In some implementations, $\alpha$ may be closer to one than to zero, at least some of the time. For example, in some implementations, $\alpha$ may be 0.9 or greater, e.g., in the range of 0.95, 0.96, 0.97, 0.98, 0.99, 0.991, etc. However, as discussed in more detail below, in some implementations $\alpha$ may be time-varying. Some implementations disclosed herein involve applying asymmetrical smoothing parameters for "attack" and "decay" processes. Examples of such implementations are provided below. In Equation 4, $d_t$ represents a current value of a network jitter parameter, which is PDV in this example, and $\hat{c}_{t-1}(\tau)$ represents an estimated CDF of $\tau$ at time t−1. The value corresponding to $d_t$ may, for example, be a time value or a packet number value (e.g., a number of packets, corresponding to a multiple of an expected time interval between packets), according to the particular implementation.

Accordingly, in some implementations an optimal jitter buffer size may be estimated as follows:

$$\hat{B}^* = \mathrm{argmin}_\tau \{\tau : \hat{c}_t(\tau) \geq 1 - C\} \quad \text{(Equation 5)}$$

In Equation 5, $\hat{B}^*$ represents an estimate of the optimal jitter buffer size.

A valid CDF will satisfy the following constraints:

$$\hat{c}_t(\tau) \leq 1 \, \forall \tau$$

$$\hat{c}_t(\tau_0) \leq \hat{c}_t(\tau_1) \, \forall \tau_0 < \tau_1$$

It can be proven that these properties are preserved when the CDF is updated according to Equation 3. Let $\alpha$, A, B be real numbers in the range [0, 1] such that A≤B, and let Q(.) be the quantization operator. Because Q(.) is monotonic, one has:

A≤B $$\overset{\Delta}{\rightarrow} \alpha A \leq \alpha B$$

$$\overset{\Delta}{\rightarrow} Q(\alpha A) \leq Q(\alpha B)$$

Further assume that (1−α) is a pre-computed constant. One may continue the above reasoning to deduce:

A≤B $\xrightarrow{\Delta} \alpha A \le \alpha B$ $\xrightarrow{\Delta} Q(\alpha A) \le Q(\alpha B)$ $\xrightarrow{\Delta} Q(\alpha A) \le Q(\alpha B) + (1-\alpha)$ $\xrightarrow{\Delta} Q(Q(\alpha A)) \le Q(Q(\alpha B) + (1-\alpha))$ and $A \le B$ $\xrightarrow{\Delta} \alpha A \le \alpha B$ $\xrightarrow{\Delta} Q(\alpha A) \le Q(\alpha B)$ $\xrightarrow{\Delta} Q(\alpha A) + (1-\alpha) \le Q(\alpha B) + (1-\alpha)$ $\xrightarrow{\Delta} Q(Q(\alpha A) + (1-\alpha)) \le Q(Q(\alpha B) + (1-\alpha))$ Therefore, the inequality $c_t(B) \le c_t(B+1)$ will be satisfied when the CDF is updated according to Equation 3 if the CDF satisfies this inequality upon initialization. If a further realistic assumption is that $Q(Q(\alpha \times 1) + (1-\alpha)) = 1$, then a CDF updated according to Equation 3 is guaranteed to be a valid CDF in finite precision arithmetic.

In some implementations, the CDF may be initialized according to a parametric model, such as an exponential function, an exponential distribution or a Pareto distribution. For example, the CDF may be initialized based on a probability density function (PDF) involving an exponential function, e.g.:

$$f(x|\alpha) = \begin{cases} \alpha^x, & x \ge 0 \\ 0, & x < 0 \end{cases} \quad \text{(Equation 6)}$$

In Equation 6, $\alpha$ represents a smoothing parameter and x represents a network jitter parameter such as IAT or PDV. A CDF based on Equation 4 may be expressed as:

$F(x|\alpha) = \int_{-\infty}^{x} f(x|\alpha) dx$

Alternatively, the CDF may be initialized based on a PDF having the shape of an exponential distribution, e.g.:

$$f(x|\lambda) = \begin{cases} \lambda e^{-\lambda x}, & x \ge 0 \\ 0, & x < 0 \end{cases} \quad \text{(Equation 7)}$$

In Equation 7, $\lambda$ represents a rate parameter. In some examples, $\lambda = 1/x_{mean}$. A CDF based on Equation 5 may be expressed as:

$$F(x|\lambda) = \begin{cases} 1 - e^{-\lambda x}, & x \ge 0 \\ 0, & x < 0 \end{cases}$$

Alternatively, the CDF may be initialized based on a PDF having the shape of a Pareto distribution, e.g.:

$$f(x|\alpha, k) = \frac{\alpha k^\alpha}{x^{\alpha+1}}; k \le x < \infty; \alpha, k > 0 \quad \text{(Equation 8)}$$

In Equation 8, k represents a minimum value of the variable x and $\alpha$ represents a shape parameter, which is sometimes referred to as a "tail index." A CDF based on Equation 6 may be expressed as:

$$F(x|\alpha, k) = 1 - \left(\frac{k}{x}\right)^\alpha; k \le x < \infty; \alpha, k > 0$$

Some implementations disclosed herein involve determining at least one parameter of a parametric model used to initialize a CDF based, at least in part, on legacy network jitter information. The legacy network jitter information may be based on a priori knowledge of the operating environment, e.g., of the communication terminals used for a teleconference and/or the network over which the communication terminals will communicate during the teleconference. The more accurate this knowledge is, the better the CDF can converge to the underlying IAT and/or PDV distribution. This convergence can provide an improved jitter buffer performance.

Figure 2:
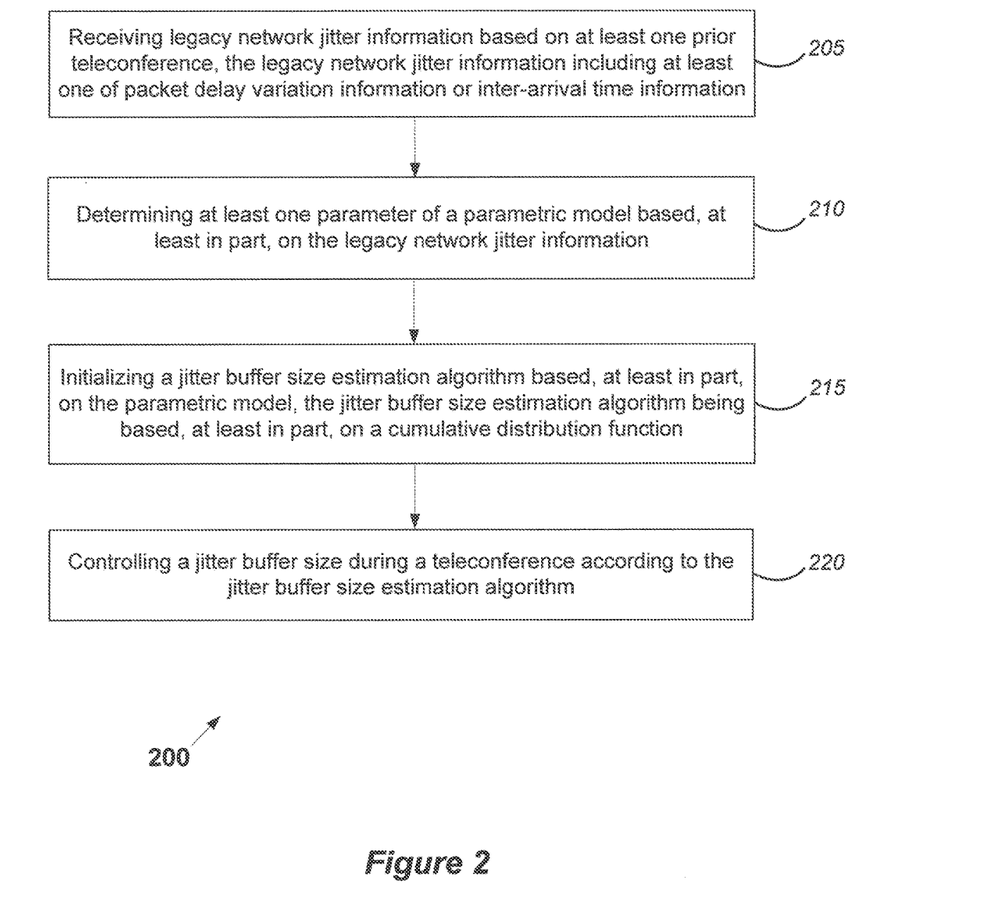
FIG. 2 is a flow diagram that illustrates blocks of some jitter butter control methods provided herein.

FIG. 2 is a flow diagram that illustrates blocks of some jitter butter control methods provided herein. Method 200 may, for example, be performed (at least in part) by a server or another such device that is configured for communicating with communication terminals, such as described above with reference to FIG. 1B. However, some methods provided herein may be performed (at least in part) by a communication terminal. For example, such methods may be performed according to software stored on a non-transitory medium. As with other method described herein, the blocks of method 200 are not necessarily performed in the order indicated. Moreover, some implementations of method 200 (and other methods disclosed herein) may include more or fewer blocks than indicated or described.

In this example, method 200 begins with block 205, which involves receiving legacy network jitter information based on at least one prior teleconference. The legacy network jitter information may, for example, include at least one of packet delay variation (PDV) information or inter-arrival time (IAT) information. The legacy network jitter information may be based on one or more environmental factors, such as network type, communication device type (e.g., communication terminal type), destination information and/or round-trip delay information.

According to some implementations, the legacy network jitter information may be selected from a database. The database may be stored locally or may be stored remotely. For example, the database may be accessible via a network (e.g., via a server such as the server shown in FIG. 1B). The legacy network jitter information may, for example, correspond with one or more environmental factors. For example, a database may include legacy network jitter information based on prior teleconferences conducted over a plurality of networks, communication device types, etc. According to some such examples, when a teleconference is initialized the database may be queried according to the network, communication device types, etc., that will be used during the current teleconference. Legacy network jitter information corresponding to the closest match of environmental factors of the current teleconference may be received in block 205.

In the example shown in FIG. 2, block 210 involves determining at least one parameter of a parametric model based, at least in part, on the legacy network jitter information. In some implementations, the legacy network jitter information may include raw network jitter parameter values, such as raw PDV data or raw IAT data, from at least one prior teleconference. Based on such raw data, a mean value of the raw PDV data or raw IAT data may be determined. From this mean value, an estimation of the rate parameter $\lambda$ for an exponential distribution may be determined as $\lambda=1/x_{mean}$, where $x_{mean}$ represents the mean value of a network jitter parameter such as PDV or IAT.

Alternatively, the legacy network jitter information may be based on raw network jitter parameter values, such as raw PDV data or raw IAT data, but may be stored and/or provided for later processing in a more efficient manner. For example, the legacy network jitter information may include a mean value of a network jitter parameter such as PDV and/or IAT from at least one prior teleconference. From this mean value, an estimation of the rate parameter $\lambda$ for an exponential distribution may be determined. Alternatively, or additionally, the legacy network jitter information may include information corresponding to a curve-fitting process performed on a network jitter parameter such as PDV data and/or IAT data from at least one prior teleconference.

In some implementations, the legacy network jitter information may include at least one parameter of the parametric model. In such implementations, calculations such as described above may have already been performed and the corresponding values stored for later retrieval. In some examples, the legacy network jitter information may include information corresponding to statistical models based on network jitter data detected during one or more prior teleconferences.

Here, block 215 involves initializing a jitter buffer size estimation algorithm based, at least in part, on the parametric model. In some implementations, the parametric model may be an exponential function, an exponential distribution, a Pareto distribution or another parametric model. In this example, the jitter buffer size estimation algorithm is based, at least in part, on a cumulative distribution function (CDF) of a network jitter parameter. However, as described in more detail below, in some implementations the jitter buffer size estimation algorithm may be based, at least in part, on a CDF and on a second function. The second function may, for example, be a parametric function or a second distribution function, such as a second CDF. The network jitter parameter or parameters may, for example, be PDV and/or IAT.

In this implementation, block 220 involves controlling a jitter buffer size during a teleconference according to the jitter buffer size estimation algorithm. In some implementations, controlling the jitter buffer size according to the jitter buffer size estimation algorithm may involve updating a CDF estimate according to a current network jitter parameter value, such as instantaneous PDV. Some such implementations may involve determining whether to increment the CDF based, at least in part, on a current network jitter parameter value. In some examples, controlling the jitter buffer size according to the jitter buffer size estimation algorithm may involve determining a jitter buffer size according to a function of the CDF and a packet loss threshold. Examples of both are provided in the foregoing discussion, e.g., with reference to Equations 3-5.

In some implementations, current network jitter information that is obtained during the teleconference may be used to update a database of legacy network jitter information. For example, raw PDV or IAT data may be stored. In some implementations, a mean value of PDV or IAT data may be determined and stored. In some examples, a curve-fitting process may be performed on PDV or IAT data from the teleconference. In some implementations, a parameter of a parametric model may be determined according to the current network jitter information that is obtained during the teleconference.

A database of legacy network jitter information may be updated with one or more of the foregoing types of network jitter information. Such information may be associated with one or more environmental factors corresponding to the teleconference, such as network type, communication device type, destination information or round-trip delay information.

In some implementations, controlling the jitter buffer size may involve applying asymmetrical smoothing parameters for attack and decay processes. In some such implementations, the smoothing parameters may be time-varying smoothing parameters. As used herein, the term "attack" may correspond with a response to a delay spike (e.g., by increasing the jitter buffer size) and "decay" may correspond with a non-attack process, such as a return to a lower jitter buffer size after an attack process. Implementations that involve asymmetrical smoothing parameters and/or time-varying smoothing parameters may or may not be used in connection with implementations involving legacy network jitter information, depending on the particular implementation. For example, in some implementations described herein, a jitter buffer size may be controlled according to a jitter buffer size estimation algorithm based, at least in part, on a cumulative distribution function involving at least one network jitter parameter. The jitter buffer size estimation algorithm may involve applying asymmetrical smoothing parameters and/or time-varying smoothing parameters. However, in some such implementations, the jitter buffer size estimation algorithm may not be initialized based on legacy network jitter information. For example, applying asymmetrical smoothing parameters for attack and decay processes may involve applying an attack smoothing parameter if the PDV is greater than a current jitter buffer size. In some implementations, applying asymmetrical smoothing parameters for attack and decay processes may involve applying a decay smoothing parameter if the PDV is not greater than a current jitter buffer size.

Such implementations can make a jitter buffer more responsive to instantaneous spikes of network jitter, while maintaining a relatively low late packet loss rate. For example, in some implementations an attack or delay smoothing parameter may be determined as follows:

$$\alpha = \begin{cases} \alpha_{attack}, & \text{if } PDV > B^* \\ \alpha_{decay}, & \text{otherwise} \end{cases} \quad \text{(Equation 9)}$$

In Equation 9, $\alpha$ represents a smoothing parameter, which may be the smoothing parameter used in other equations set forth herein (such as Equation 4). In Equation 9, $\alpha_{attack}$ represents an attack smoothing parameter, $\alpha_{decay}$ represents a decay smoothing parameter, PDV represents a current packet delay value and B* represents a current jitter buffer size. According to Equation 9, the default smoothing parameter is $\alpha_{decay}$. The smoothing parameter is set to $\alpha_{attack}$ only when a current packet delay value exceeds the current jitter buffer size. Some such implementations involve incrementing an attack smoothing parameter in response to spikes of network jitter, e.g., as follows:

$$\alpha_{attack} = \min(\alpha_{max}, \alpha_{attack} + \alpha_{attack\_step}) \quad \text{(Equation 10)}$$

In Equation 10, $\alpha_{attack}$ represents an attack smoothing parameter, $\alpha_{max}$ represents a maximum smoothing parameter value and $\alpha_{attack\_step}$ represents an increment for the attack smoothing parameter value. In some implementations, $\alpha_{max}$ and $\alpha_{attack\_step}$ may be determined as follows:

$$\alpha_{max} = 1 - \frac{1}{T_{max}/T_{packet}} \quad \text{(Equation 11)}$$

$$\alpha_{attack\_step} = \frac{\alpha_{max} - \alpha_{attack\_min}}{T_{max}/T_{packet}} \quad \text{(Equation 12)}$$

In Equations 11 and 12, $T_{max}$ represents a maximum time constant for smoothing, which may be in the range of tens of seconds in some implementations, e.g., 10 seconds, 15 seconds, 20 seconds, 25 seconds, 30 seconds, etc. In Equations 11 and 12, $T_{packet}$ represents an expected time interval between packet arrivals and $\alpha_{attack\_min}$ represents a minimum value of $\alpha_{attack}$. In some implementations, $\alpha_{attack\_min}$ may be determined as follows:

$$\alpha_{attack\_min} = 1 - \frac{1}{T_{attack\_min}/T_{packet}} \quad \text{(Equation 13)}$$

In Equation 13, $T_{attack\_min}$ represents a minimum time interval for "attack smoothing." In other words, $T_{attack\_min}$ represents a minimum time interval during which the smoothing parameter will be set to the attack smoothing parameter $\alpha_{attack}$. In some implementations $T_{attack\_min}$ may be in the range of seconds, e.g., 1 second, 2 seconds, 3 seconds, 4 seconds, 5 seconds, 6 seconds, etc. By incrementing the attack smoothing parameter during each time interval during which a current packet delay value exceeds a current jitter buffer size (e.g., subject to a maximum smoothing parameter value and/or a maximum time interval), the smoothing becomes more and more aggressive (more smooth) and the jitter buffer becomes relatively less responsive to instantaneous network jitter.

According to some such implementations, the decay smoothing parameter $\alpha_{decay}$ may be determined as follows:

$$\alpha_{decay} = \min(\alpha_{max}, \alpha_{decay} + \alpha_{decay\_step}) \quad \text{(Equation 14)}$$

In Equation 14, $\alpha_{decay\_step}$ represents an increment of $\alpha_{decay}$. In some implementations, $\alpha_{decay\_step}$ may be determined as follows:

$$\alpha_{decay\_step} = \frac{\alpha_{max} - \alpha_{decay\_min}}{T_{max}/T_{packet}} \quad \text{(Equation 15)}$$

In Equation 15, $\alpha_{decay\_min}$ represents a minimum value for the smoothing parameter $\alpha_{decay}$. In some implementations, $\alpha_{decay\_min}$ may be 0.9 or greater, e.g., 0.90, 0.91, 0.92, 0.92, 0.93, 0.94, 0.95, 0.96, 0.97, 0.98, 0.99, 0.991, etc. In some implementations, $\alpha_{decay\_min}$ may be determined as follows:

$$\alpha_{decay\_min} = 1 - \frac{1}{T_{decay\_min}/T_{packet}} \quad \text{(Equation 16)}$$

In Equation 16, $T_{decay\_min}$ represents a minimum time interval for "decay smoothing." In other words, $T_{decay\_min}$ represents a minimum time interval during which the smoothing parameter will be set to the decay smoothing parameter $\alpha_{decay}$. In some implementations $T_{decay\_min}$ may be in the range of tenths of seconds or seconds, e.g., 0.1 second, 0.2 seconds, 0.3 seconds, 0.4 seconds, 0.5 seconds, 0.6 seconds, 0.7 seconds, 0.8 seconds, 0.9 seconds, 1.0 second, 1.1 seconds, 1.2 seconds, 1.3 seconds, 1.4 seconds, 1.5 seconds, 1.6 seconds, 1.7 seconds, 1.8 seconds, 1.9 seconds, 2.0 seconds, 2.1 seconds, 2.2 seconds, 2.3 seconds, 2.4 seconds, 2.5 seconds, etc.

However, the foregoing equations and parameter values are only examples of asymmetric, time-varying smoothing parameters. In other implementations, for example, the minimum attack and/or decay smoothing parameters may not be functions of time constants for applying the smoothing parameters. For example, the minimum attack and/or decay smoothing parameters may be predetermined constant values. Similarly, the maximum smoothing parameter value may be a predetermined constant.

In some implementations the jitter buffer size estimation algorithm may be based on a CDF and on another function. Such implementations may be advantageous in order to more closely approximate network jitter behavior that has been observed for particular networks.

Figure 3:
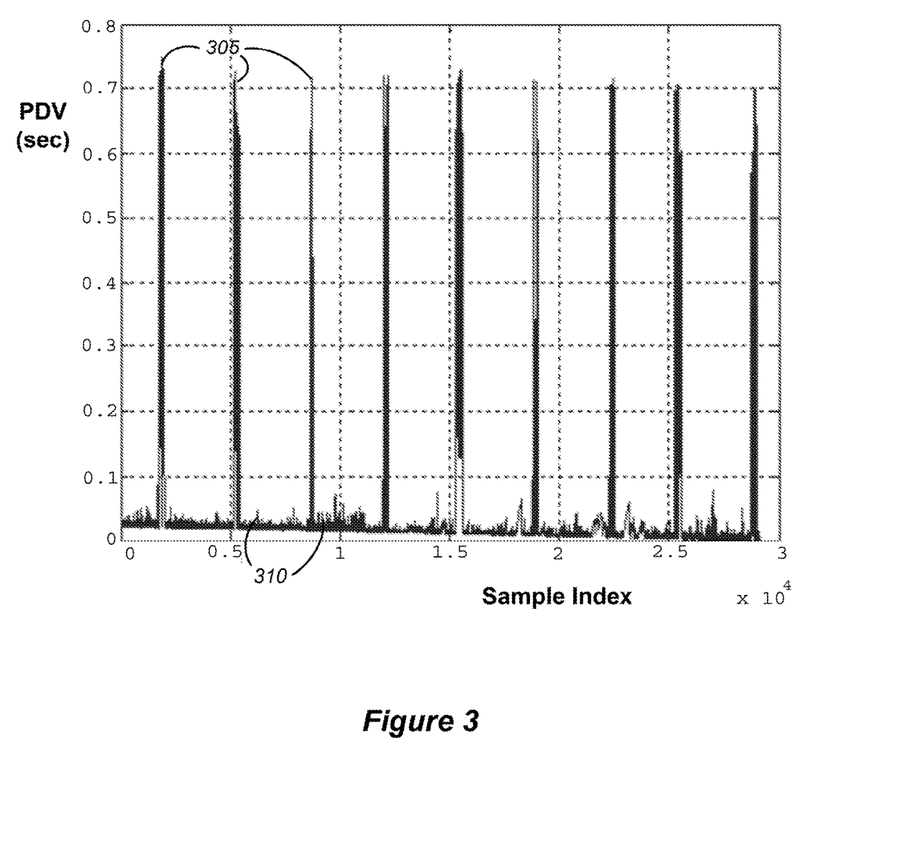
FIG. 3 is a graph that shows an example of packet delay variation in a WiFi network.

FIG. 3 is a graph that shows an example of packet delay variation in a WiFi network. In FIG. 3, the y axis represents packet delay variation and the x axis represents a sample index. The sample index may, for example, correspond with numbers of packets received after a particular time, such as a time at which a teleconference began.

At least two general features of PDV may be observed in FIG. 3. One feature is a deterministic component 305, which also may be referred to as a periodic or quasi-periodic component. In this example, the deterministic component 305 includes delay spikes of up to approximately 0.7 seconds, which occur at sample index intervals of approximately 3,000 samples. Another feature of the PDV graph in FIG. 3 is a non-deterministic component 310, which also may be referred to as a random or quasi-random component. In this example, the non-deterministic component 310 includes delay variations having significantly lower amplitudes than those of the deterministic component 305. However, the delay spikes of the non-deterministic component 310 occur much more frequently than those of the deterministic component 305.

The PDV graph in FIG. 3 may be viewed as a time series or a function that contains both deterministic and non-deterministic components. As noted above, in some implementations the jitter buffer size estimation algorithm may be based on a CDF and on another function. The two functions may be combined, e.g., by addition or by another mathematical operation, such as multiplication or convolution.

According to some implementations, the jitter buffer size estimation algorithm may be based on the CDF and on a second distribution function. One distribution function may represent a deterministic component of the jitter buffer size estimation algorithm and the other distribution function may represent a non-deterministic component of the jitter buffer size estimation algorithm. In some implementations, the second distribution function may be a second CDF.

Alternatively, the jitter buffer size estimation algorithm may be based on the CDF and on a parametric function, such as a periodic or quasi-periodic function. The parametric function may represent a deterministic component of the jitter buffer size estimation algorithm and the CDF may represent a non-deterministic component of the jitter buffer size estimation algorithm.

Figure 4:
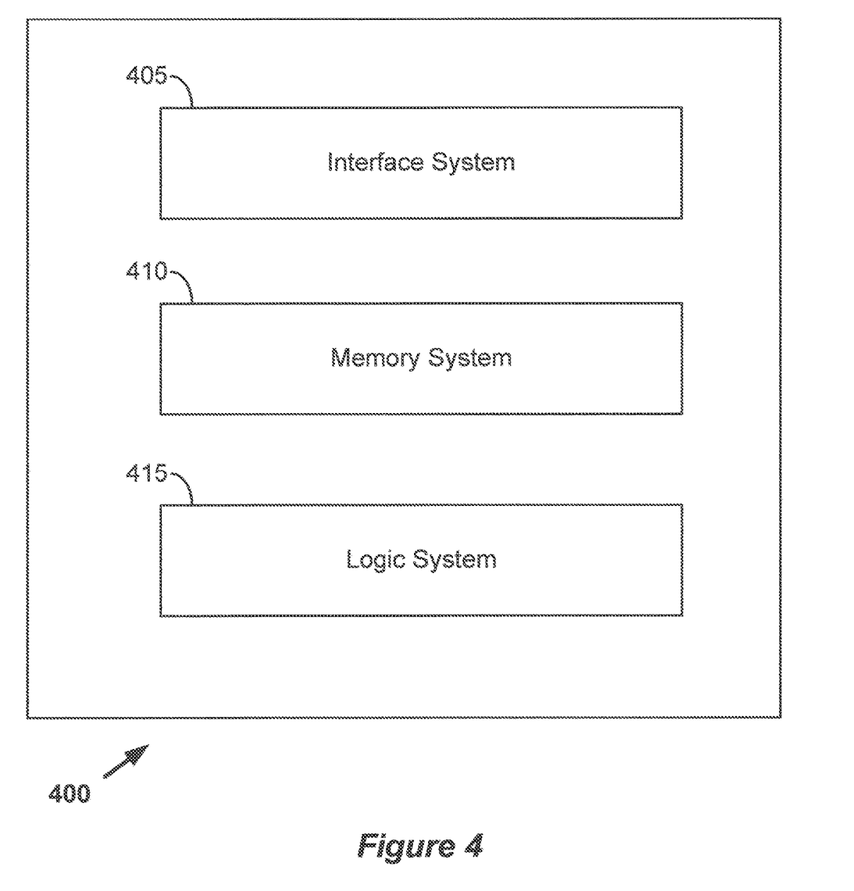
FIG. 4 is a block diagram that provides examples of components of an apparatus capable of implementing various aspects of this disclosure.

FIG. 4 is a block diagram that provides examples of components of an apparatus capable of implementing various aspects of this disclosure. The apparatus 400 may, for example, be (or may be a portion of) a communication terminal, a server, etc. In some examples, the apparatus may be implemented in a component of another device. For example, in some implementations the apparatus 400 may be a line card.

In this example, the apparatus 400 includes an interface system 405, a memory system 410 and a logic system 415. The logic system 415 and/or the memory system 410 may be capable of establishing one or more jitter buffers in the memory system 410. The interface system 405 may include a network interface, an interface between the logic system and the memory system and/or an external device interface (such as a universal serial bus (USB) interface). The logic system 415 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In this example, the logic system 415 is capable of receiving, via the interface system 405, legacy network jitter information based on at least one prior teleconference. The legacy network jitter information may include packet delay variation (PDV) information and/or inter-arrival time (IAT) information. The logic system 415 may be capable of determining at least one parameter of a parametric model based, at least in part, on the legacy network jitter information. The logic system 415 may be capable of initializing a jitter buffer size estimation algorithm based, at least in part, on the parametric model. The jitter buffer size estimation algorithm may be based, at least in part, on a cumulative distribution function (CDF) of a network jitter parameter. The logic system 415 may be capable of controlling a jitter buffer size during a teleconference according to the jitter buffer size estimation algorithm.

In some implementations, controlling the jitter buffer size may involve applying asymmetrical smoothing parameters for attack and decay processes. The asymmetrical smoothing parameters may be time-varying in some examples. The logic system is capable of determining a packet delay variation (PDV) or other network jitter parameter. In some implementations, applying asymmetrical smoothing parameters for attack and decay processes may involve applying an attack smoothing parameter if the PDV (or other network jitter parameter) is greater than a current jitter buffer size. In some examples, applying asymmetrical smoothing parameters for attack and decay processes may involve applying a decay smoothing parameter if the PDV is not greater than a current jitter buffer size.

Figure 5:
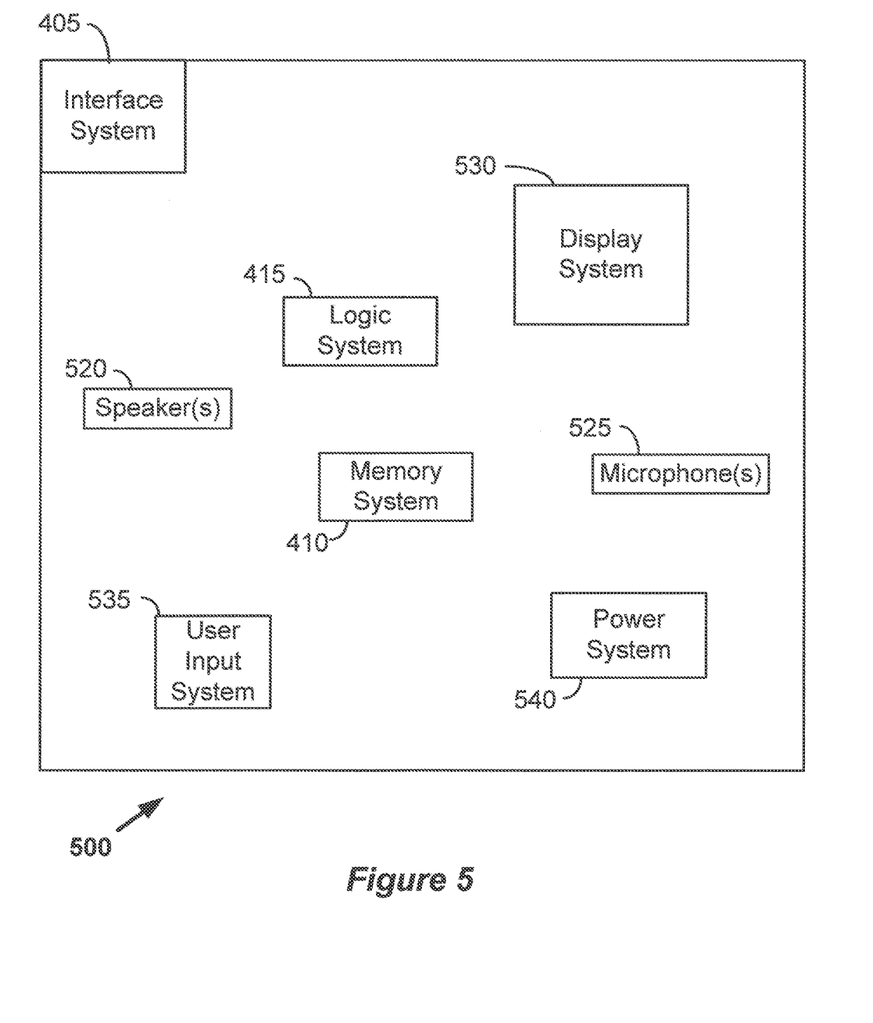
FIG. 5 is a block diagram that provides examples of components of an audio processing apparatus.

FIG. 5 is a block diagram that provides examples of components of an audio processing apparatus. In this example, the device 500 includes an interface system 405. The interface system 405 may include a network interface, such as a wireless network interface. Alternatively, or additionally, the interface system 405 may include a universal serial bus (USB) interface or another such interface.

The device 500 includes a logic system 415. The logic system 415 may include a processor, such as a general purpose single- or multi-chip processor. The logic system 415 may include a digital signal processor (DSP), an application specific integrated circuit (ASIC), a field programmable gate array (FPGA) or other programmable logic device, discrete gate or transistor logic, or discrete hardware components, or combinations thereof. The logic system 415 may be configured to control the other components of the device 500. For example, the logic system 415 may be capable of controlling a size of one or more jitter buffers in the memory system 410. Although no interfaces between the components of the device 500 are shown in FIG. 5, the logic system 415 may be configured with interfaces for communication with the other components. The other components may or may not be configured for communication with one another, as appropriate.

The logic system 415 may be configured to perform audio data analysis and jitter buffer control functionality, including but not limited to the functionality described herein. In some such implementations, the logic system 415 may be configured to operate (at least in part) according to software stored one or more non-transitory media. The non-transitory media may include memory associated with the logic system 415, such as random access memory (RAM) and/or read-only memory (ROM). The non-transitory media may include memory of the memory system 410. The memory system 410 may include one or more suitable types of non-transitory storage media, such as flash memory, a hard drive, etc.

The logic system 415 may be configured to receive frames of encoded audio data via the interface system 405 and to decode the encoded audio data. Alternatively, or additionally, the logic system 415 may be configured to receive frames of encoded audio data via an interface between the memory system 410 and the logic system 415. The logic system 415 may be configured to control the speaker(s) 520 according to decoded audio data.

The display system 530 may include one or more suitable types of display, depending on the manifestation of the device 500. For example, the display system 530 may include a liquid crystal display, a plasma display, a bistable display, etc.

The user input system 535 may include one or more devices configured to accept input from a user. In some implementations, the user input system 535 may include a touch screen that overlays a display of the display system 530. The user input system 535 may include a mouse, a track ball, a gesture detection system, a joystick, one or more GUIs and/or menus presented on the display system 530, buttons, a keyboard, switches, etc. In some implementations, the user input system 535 may include the microphone 525: a user may provide voice commands for the device 500 via the microphone 525. The logic system may be configured for speech recognition and for controlling at least some operations of the device 500 according to such voice commands.

The power system 540 may include one or more suitable energy storage devices, such as a nickel-cadmium battery or a lithium-ion battery. The power system 540 may be configured to receive power from an electrical outlet.

Various modifications to the implementations described in this disclosure may be readily apparent to those having ordinary skill in the art. The general principles defined herein may be applied to other implementations without departing from the spirit or scope of this disclosure.

Moreover, the described embodiments may be implemented in a variety of hardware, software, firmware, etc. For example, aspects of the present application may be embodied in a system, in a device (e.g., a cellular telephone, a portable media player, a personal computer, a server, a television set-top box, a digital video recorder or other media player), a method or a computer program product. Accordingly, aspects of the present application may take the form of a hardware embodiment, a software embodiment (including firmware, resident software, microcodes, etc.) or an embodiment combining both software and hardware aspects. Such embodiments may be referred to herein as a "circuit," "module" or "system." Furthermore, aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability. Thus, the claims are not intended to be limited to the implementations shown herein, but are to be accorded the widest scope consistent with this disclosure, the principles and the novel features disclosed herein.

We claim:

1. A method, comprising:
    receiving legacy network jitter information based on at least one prior teleconference, the legacy network jitter information including at least one of packet delay variation (PDV) information or inter-arrival time (IAT) information;
    determining at least one parameter of a parametric model based, at least in part, on the legacy network jitter information;
    determining a cumulative distribution function (CDF) of a network jitter parameter using the parametric model;
    initializing a jitter buffer size estimation algorithm based, at least in part, on the cumulative distribution function (CDF); and
    controlling a jitter buffer size during a teleconference according to the jitter buffer size estimation algorithm.

2. The method of claim 1, wherein controlling the jitter buffer size involves applying asymmetrical smoothing parameters for attack and decay processes and wherein the asymmetrical smoothing parameters are time-varying.

3. The method of claim 2, further comprising determining a packet delay variation (PDV), wherein applying asymmetrical smoothing parameters for attack and decay processes involves applying an attack smoothing parameter if the PDV is greater than a current jitter buffer size.

4. The method of claim 2, further comprising determining a packet delay variation (PDV), wherein applying asymmetrical smoothing parameters for attack and decay processes involves applying a decay smoothing parameter if the PDV is not greater than a current jitter buffer size.

5. The method of claim 1, wherein the jitter buffer size estimation algorithm is based on the CDF and on a second distribution function.

6. The method of claim 5, wherein one distribution function represents a deterministic component of the jitter buffer size estimation algorithm and the other distribution function represents a non-deterministic component of the jitter buffer size estimation algorithm.

7. The method of claim 1, wherein the jitter buffer size estimation algorithm is based on the CDF and on a parametric function.

8. The method of claim 7, wherein the parametric function represents a deterministic component of the jitter buffer size estimation algorithm and the CDF represents a non-deterministic component of the jitter buffer size estimation algorithm.

9. The method of claim 1, wherein the legacy network jitter information includes at least one parameter of the parametric model.

10. The method of claim 1, wherein the legacy network jitter information includes information corresponding to statistical models based on one or more prior teleconferences.

11. The method of claim 1, wherein the legacy network jitter information includes information corresponding to a curve-fitting process performed on at least one of PDV or IAT data from at least one prior teleconference.

12. The method of claim 1, wherein the legacy network jitter information includes a mean value of at least one of PDV or IAT from at least one prior teleconference.

13. The method of claim 1, wherein the legacy network jitter information includes at least one of raw PDV data or raw IAT data from at least one prior teleconference.

14. The method of claim 1, wherein the legacy network jitter information is based on one or more environmental factors.

15. The method of claim 14, wherein the environmental factors include one or more of network type, communication device type, destination information or round-trip delay information.

16. The method of claim 1, further comprising:
    obtaining current network jitter information during the teleconference; and
    updating a database of legacy network jitter information based on the current network jitter information.

17. The method of claim 1, wherein the CDF is based, at least in part, on a network jitter parameter.

18. The method of claim 17, wherein the network jitter parameter is PVD or IAT.

19. The method of claim 17, wherein controlling the jitter buffer size according to the jitter buffer size estimation algorithm involves determining whether to increment the CDF based, at least in part, on a current network jitter parameter value.

20. The method of claim 1, wherein controlling the jitter buffer size according to the jitter buffer size estimation algorithm involves determining a minimum jitter buffer size according to a function of the CDF and a packet loss threshold.

21. A non-transitory computer-readable medium storing instructions which, when executed by one or more processors, perform the following:
    receiving legacy network jitter information based on at least one prior teleconference, the legacy network jitter information including at least one of packet delay variation (PDV) information or inter-arrival time (IAT) information;
    determining at least one parameter of a parametric model based, at least in part, on the legacy network jitter information;
    determining a cumulative distribution function (CDF) of a network jitter parameter using the parametric model;
    initializing a jitter buffer size estimation algorithm based, at least in part, on the cumulative distribution function (CDF); and
    controlling a jitter buffer size during a teleconference according to the jitter buffer size estimation algorithm.

* * * * *